(12) United States Patent
Sloss et al.

(10) Patent No.: US 10,572,889 B2
(45) Date of Patent: Feb. 25, 2020

(54) ADVANCED NOTIFICATION TO ENABLE USAGE REDUCTION

(71) Applicant: Opower, Inc., Arlington, VA (US)

(72) Inventors: Brian Sloss, San Francsico, CA (US); Koorosh Nouri, San Francisco, CA (US)

(73) Assignee: OPOWER, INC., Redwood Shores, CA (US)

(*) Notice: Subject to any disclaimer, the term of this patent is extended or adjusted under 35 U.S.C. 154(b) by 1155 days.

(21) Appl. No.: 14/581,569

(22) Filed: Dec. 23, 2014

(65) Prior Publication Data
US 2016/0042368 A1 Feb. 11, 2016

Related U.S. Application Data

(60) Provisional application No. 62/034,529, filed on Aug. 7, 2014.

(51) Int. Cl.
*G06Q 30/02* (2012.01)
*G06Q 30/04* (2012.01)
(Continued)

(52) U.S. Cl.
CPC ......... *G06Q 30/0202* (2013.01); *G06Q 20/14* (2013.01); *G06Q 30/04* (2013.01); *G06Q 50/06* (2013.01)

(58) Field of Classification Search
None
See application file for complete search history.

(56) References Cited

U.S. PATENT DOCUMENTS

| 4,334,275 A | 6/1982 | Levine |
|---|---|---|
| 4,843,575 A | 6/1989 | Crane |

(Continued)

FOREIGN PATENT DOCUMENTS

| AU | 2010315015 | 7/2014 |
|---|---|---|
| CA | 2779754 | 5/2011 |

(Continued)

OTHER PUBLICATIONS

International Search Report and Written Opinion for PCT Application No. PCT/US2015/038692, dated Sep. 24, 2015, 13 pages.
(Continued)

*Primary Examiner* — Eric W Stamber
*Assistant Examiner* — Ashley Y Young
(74) *Attorney, Agent, or Firm* — Kraguljac Law Group, LLC

(57) ABSTRACT

According to various aspects of the subject technology, systems and methods for analyzing consumption data associated with a user to determine a projected consumption cost for the user. The projected consumption cost can indicate an expected monetary cost that the user will be required to pay for resource consumption during a specified time period. If it is determined that the projected consumption cost exceeds a threshold consumption cost indicating that the projected consumption cost of the user will be high, the user can be provided with one or more use reports notifying the user that the user's projected consumption cost will be high for the time period. The use reports can warn the user that a high bill should be expected, thereby reducing bill shock and ensuing call center calls.

32 Claims, 9 Drawing Sheets

(51) Int. Cl.
*G06Q 20/14* (2012.01)
*G06Q 50/06* (2012.01)

(56) References Cited

U.S. PATENT DOCUMENTS

| | | | |
|---|---|---|---|
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |
| 5,930,773 A | 7/1999 | Crooks et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| 7,991,513 B2 | 8/2011 | Pitt |
| 8,065,098 B2 | 11/2011 | Gautam |
| 8,166,047 B1 | 4/2012 | Cohen et al. |
| 8,180,591 B2 | 5/2012 | Yuen et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| 8,583,288 B1 | 11/2013 | Rossi et al. |
| 8,630,741 B1 | 1/2014 | Matsuoka et al. |
| 8,660,813 B2 | 2/2014 | Curtis et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| D714,335 S | 9/2014 | Cojuangco et al. |
| D729,268 S | 5/2015 | Nies et al. |
| 9,031,703 B2 | 5/2015 | Nakamura et al. |
| D740,847 S | 10/2015 | Yampolskiy et al. |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0103549 A1 | 5/2006 | Hunt et al. |
| 2006/0195438 A1 | 8/2006 | Galuten |
| 2006/0241905 A1* | 10/2006 | McCalla ............... G06Q 10/00 702/182 |
| 2006/0246968 A1 | 11/2006 | Dyke-Wells |
| 2007/0061735 A1 | 3/2007 | Hoffberg et al. |
| 2007/0203860 A1* | 8/2007 | Golden ............... G06Q 10/04 705/412 |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0167535 A1 | 7/2008 | Stivoric et al. |
| 2008/0195561 A1 | 8/2008 | Herzig |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0241648 A1 | 9/2010 | Ito et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2011/0313964 A1 | 12/2011 | Sanchey Loureda et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. |
| 2012/0143536 A1* | 6/2012 | Greaves ............... G06Q 40/00 702/60 |
| 2012/0179692 A1 | 7/2012 | Hsiao et al. |
| 2012/0215369 A1 | 8/2012 | Desai et al. |
| 2012/0216123 A1 | 8/2012 | Shklovskii et al. |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0097481 A1 | 4/2013 | Kotler et al. |
| 2013/0173064 A1 | 7/2013 | Fadell et al. |

(56) References Cited

U.S. PATENT DOCUMENTS

| | | |
|---|---|---|
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0006314 A1 | 1/2014 | Yu et al. |
| 2014/0019319 A1 | 1/2014 | Derby et al. |
| 2014/0074300 A1 | 3/2014 | Shilts et al. |
| 2014/0107850 A1 | 4/2014 | Curtis |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0337107 A1 | 11/2014 | Foster |
| 2015/0227522 A1 | 8/2015 | O'Donnell et al. |
| 2015/0227846 A1 | 8/2015 | Mercer et al. |
| 2015/0254246 A1 | 9/2015 | Sheth et al. |
| 2015/0267935 A1 | 9/2015 | Devenish et al. |
| 2015/0269664 A1 | 9/2015 | Davidson |
| 2015/0310019 A1 | 10/2015 | Royer et al. |
| 2015/0310463 A1 | 10/2015 | Turfboer et al. |
| 2015/0310465 A1 | 10/2015 | Chan et al. |
| 2015/0324819 A1 | 11/2015 | Lin et al. |
| 2015/0326679 A1 | 11/2015 | Lin et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May 19, 2008, 15 pages, available at http://web.archive.orgi/web/20080519220643/bie.berkeley.edu/coolcale/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Sotfware, vol. 33, Iss. 1, pp. 1-22, Jan. 2010.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
JAWBONE, "Know yourself. Live better." https://jawbone.com/up/, 7 pages, Jul. 15, 2013.
Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study-Part II: Disaggregation Framework, Simulation, and Applications," IEEE Transactions on Power Delivery, vol. 25, No. 2, pp. 561-569, Apr. 2010.

(56) References Cited

OTHER PUBLICATIONS

Liang, Jian, et al., "Load Signature Study—Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
NEST, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f..uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

* cited by examiner

ADVANCED NOTIFICATION TO ENABLE USAGE REDUCTION

CROSS-REFERENCE TO RELATED APPLICATIONS

The present application claims the benefit of priority to U.S. Provisional Application Ser. No. 62/034,529, filed Aug. 7, 2014, entitled "ADVISOR AND NOTIFICATION TO REDUCE BILL SHOCK," which is hereby incorporated by reference in its entirety.

BACKGROUND

The subject technology relates to data processing systems, and in particular, to energy usage alerts for a climate control device.

Annually, utilities spend a large amount of money to support inbound calls/complaints associated with high bills. Many of these calls are caused by the shock that the customer experiences when they receive a bill that is higher than they were expecting. This high volume of inbound calls/complaints can cause a decrease in operational efficiency, resulting in long wait times for customers, thereby exasperating customer dissatisfaction. Furthermore, supporting the volume of inbound calls/complaints with staff, resources, and infrastructure is also extremely costly for a utility.

SUMMARY

The subject technology includes computer-implemented method for providing an advanced bill notification, the method comprising: analyzing, by a computer processor, consumption data associated with a user to determine a projected consumption cost for the user, the projected consumption cost indicating an expected monetary cost that the user will be required to pay for resource consumption during a first time period; determining, by the computer processor, that the projected consumption cost exceeds a threshold consumption cost indicating that the projected consumption cost of the user will be high; and providing, by the computer processor, one or more use reports to the user notifying the user that the projected consumption cost will be high for the first time period.

The subject technology provides a computing device for energy usage alerts, the computing device comprising: at least one processor; and memory storing instructions that, when executed by the at least one processor, cause the computing device to: analyze consumption data associated with a user to determine a projected consumption cost for the user, wherein the projected consumption cost indicates an expected monetary cost that the user will be required to pay for resource consumption during a first time period; determine that the projected consumption cost exceeds a threshold consumption cost indicating that the projected consumption cost of the user will be high; and provide one or more use reports to the user notifying the user that the user's projected consumption cost will be high for the first time period.

The subject technology further provides a non-transitory computer readable storage medium storing instructions for usage alerts without smart meter data on a computing device, the instructions when executed by a processor causing the processor to: analyze consumption data associated with a user to determine a projected consumption cost for the user, wherein the projected consumption cost indicates an expected monetary cost that the user will be required to pay for resource consumption during a first time period; determine that the projected consumption cost exceeds a threshold consumption cost indicating that the projected consumption cost of the user will be high; and provide one or more use reports to the user notifying the user that the user's projected consumption cost will be high for the first time period.

The subject technology further provides a computer-implemented method for providing a bill notification, the method comprising: analyzing, by a computer processor, after a first time period has elapsed consumption data associated with a user to determine a consumption cost for the user, the consumption cost indicating a monetary cost that the user will be required to pay for resource consumption during the first time period, the first time period being a period of time in which the user's energy consumption is tracked to determine a bill; determining, by the computer processor, that the consumption cost exceeds a threshold consumption cost, the threshold consumption cost being determined based at least in part on historical consumption cost data; and providing, by the computer processor, one or more use reports to the user notifying the user that the consumption cost is high for the first time period.

The subject technology further provides a computing device for bill notifications, the computing device comprising: at least one processor; and memory storing instructions that, when executed by the at least one processor, cause the computing device to: analyze, after a first time period has elapsed, consumption data associated with a user to determine a consumption cost for the user, the consumption cost indicating a monetary cost that the user will be required to pay for resource consumption during the first time period, the first time period being a period of time in which the user's energy consumption is tracked to determine a bill; determine that the consumption cost exceeds a threshold consumption cost, the threshold consumption cost being determined based at least in part on historical consumption cost data; and provide one or more use reports to the user notifying the user that the consumption cost is high for the first time period.

The subject technology further provides non-transitory computer readable storage medium storing instructions for usage alerts on a computing device, the instructions when executed by a processor causing the processor to: analyze, after a first time period has elapsed, consumption data associated with a user to determine a consumption cost for the user, the consumption cost indicating a monetary cost that the user will be required to pay for resource consumption during the first time period, the first time period being a period of time in which the user's energy consumption is tracked to determine a bill; determine that the consumption cost exceeds a threshold consumption cost, the threshold consumption cost being determined based at least in part on historical consumption cost data; and provide one or more use reports to the user notifying the user that the consumption cost is high for the first time period.

BRIEF DESCRIPTION OF THE DRAWINGS

In the following description, reference is made to the following figures, and in which are shown by way of illustration specific embodiments in which the subject technology may be practiced. It is to be understood that other embodiments may be utilized and changes may be made without departing from the scope of the subject technology.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Utility providers may spend a nontrivial amount of money to support inbound calls or complaints associated with high bills. Many of these calls may be caused by the shock that the customer experiences when they receive a bill that is higher than they were expecting. This high volume of inbound calls/complaints can cause a decrease in operational efficiency, resulting in long wait times for customers, thereby exasperating customer dissatisfaction. In many instances, these customers do not receive prior notice of higher bills due to existing constraints in systems provided by utility providers.

Embodiments of the subject technology describes approaches to increase the operational efficiency of utility providers in the context of preventing or reducing customer bill shock. One way to prevent the bill shock from occurring is to use the behavioral lever of reminders, for example, to inform customers of what they are projected to spend at the end of the bill period and better explain the factors that influence their bill. Preventing bill shock can reduce call center volume and increase the utility's operational efficiency. There are two critical moments in a customer's lifecycle with their energy provider, which can be leveraged to reduce calls associated with bill shock. A first moment is some time during their bill, when the customer is on track for a high bill, which can be leveraged to provide the customer with an early warning/reminder that they are on track for a high bill. A second moment is when the bill is ready for payment, and a bill arrival notification would notify the customer that their bill is ready for payment, provide a personalized explanation of the cost/consumption and promote payment of the bill through online billing.

Systems and method described herein are directed to an energy alert system to mitigate bill shock by analyzing energy consumption data for the aforementioned bill periods and moments therein and subsequently sending notification(s) to one or more utility customers to alert such customers of abnormal or higher energy consumption costs based on one or more factors as further described herein.

Figure 1:
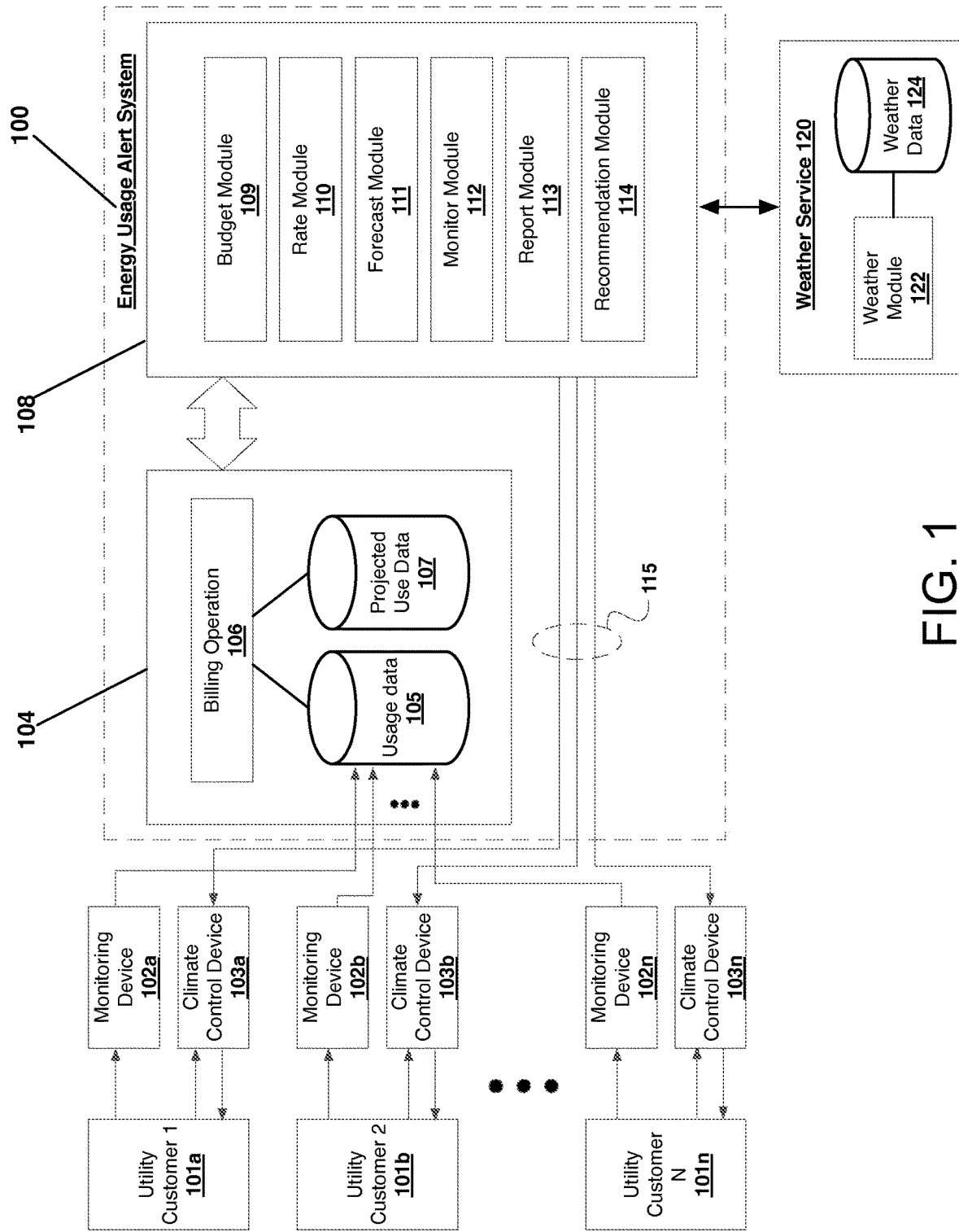
FIG. 1 illustrates an example of an energy usage alert system, according to certain aspects of the subject technology.

FIG. 1 illustrates an example of an energy usage alert system 100, according to certain aspects of the subject technology. The energy usage alert system 100 includes a utility management system 104 and a billing management system 108. The utility management system 104 is coupled to utility customers 101 via monitoring devices 102 and climate control devices 103. The utility management system 104 includes usage database 105, a billing operation module 106 and projected use database 107. The billing management system 108 includes a budget module 109, a rate module 110, a forecast module 111, a monitor module 112, a report module 113 and a recommendation module 114. The billing management system 108 may convey information targeted to one or more of the utility customers 101a-101n over communication channels 115.

The utility management system 104 stores usage data in the usage database 105. The usage data is associated with one or more commodities consumed by the utility customers 101. The usage data may include usage information corresponding to usage of at least one of the one or more commodities for multiple utility customers (e.g., utility customers 101a, 101b . . . 101n). The usage-information may include past usage information of the commodity during at least one of completed billing period and a current usage of the at least one of the one or more commodities during a completed portion of a current billing period. The usage data for a utility customer may be obtained from a corresponding monitoring device on a scheduled basis, periodic basis or a non-scheduled basis. The monitoring devices (e.g., monitoring devices 102a, 102b . . . 102n) may relate to an advanced metering infrastructure (AMI). In this respect, the monitoring devices may be smart meters or, at least in part, include smart meter functionality for measuring electrical, water and/or natural gas consumption in the property associated with the corresponding utility customer. For example, the usage data may consist of usage information corresponding to the property in its entirety such that usage information relating to one or more components in the property is disaggregated by the utility management system 104 and/or the billing management system 108. Additionally or alternatively, the usage data may consist of a multitude of values or readings that represent recorded levels of consumption of a commodity during a number of intervals (e.g., every hour, every 15 minutes, etc.) rather than a total consumption of the commodity in between measuring periods or for a billing period. In another example, the usage data 105 may contain information from non-AMI sources such as an analog meter, which is provided to the utility management system 104 by other means. In an aspect, the utility management system 104 stores and forwards the usage data to the billing management system 108 for usage alert processing. The utility management system 104 may forward the usage data to the billing management system 108 for storage and usage alert processing. The utility management system 104 described herein may refer to a utility company or an offsite third party service provider that is interfaced with the utility company.

The utility management system 104 stores projected use information in the projected use database 107. The projected use information may be based on the usage data and estimated usage for a remaining amount of time in the current billing period. For example, the billing operation module 106 may obtain the usage data to determine a rate of use for the corresponding utility customer. The rate of use may be based on the amount of energy consumed over a specified number of days, for example. The rate of use may be applied to the remaining amount of time to determine the estimated usage. As such, the projected use information may consist of the usage data to date and the estimated usage for the remaining time in the billing period. A more detailed description of the projected use determination will be described in FIG. 2.

The budget module 109 may determine a target budget for the current billing period based on the usage data. In an aspect, the budget module 109 may include a budget advisor, which is an automated system for at least determining one or more candidate budget targets. The rate module 110 may store a local copy of a rate schedule associated with the fees for commodities provided by the utility company. The rate module 110 may be configured to obtain the rate schedule, associated with the current billing period, from the utility company or energy provider. The forecast module 111 may be configured to forecast the projected use of energy by the utility customers 101*a*-101*n* based on the corresponding usage data. The forecast module 111 may include an algorithm used to determine the projected use information using rate of use information and billing period information. The monitor module 112 may include an interface to the monitoring devices 102*a*-102*n* to obtain the usage data directly and/or include an interface with the utility management system 104 to receive the usage data for further processing by one or more components of the billing management system 108 (e.g., projected use information, rate of use information, target budgets). The report module 113 may be configured to generate a usage alert notification, and cause the usage alert notification to be sent to one or more of the utility customers 101*a*-101*n* based on one or more reporting conditions (e.g., projected bill exceeding target budget, current billing period ended, utility customer inquiry, etc.) through the communication channels 115. The recommendation module 114 may be configured to provide one or more recommendations to one or more of utility customers 101*a*, 101*b* to 101*n* for reducing energy usage and/or preventing or mitigating bill shock.

The communication channels 115 may carry alert notifications to the utility customers 101*a*-101*n* over a wired and/or a wireless communication. Further such notifications may be provided though email, Short Message Service (SMS) or interactive voice response (IVR) channels. Although communication via electronic means is described as example, it is contemplated that the subject technology may use a communication channel that is through printed physical mail. In an embodiment, a message or communication may be sent, through an interface, to a printing and mailing service. The printing and mailing service may then generate physical mail including, for example, alert messages for high energy usage to mitigate bill shock, and then mailing the physical mail to respective addresses of utility customers.

In an aspect, the billing management system 108 sends the alert notifications in a broadcast and/or multicast signal to the utility customers 101*a*-101*n* via the climate control devices 103*a*-103*n* or other device (e.g., a smart phone or other mobile device) associated with the utility customers 101*a*-101*n*. The billing management system 108 may specifically target one or more of the utility customers 101*a*-101*n*, and send a personalized alert notification over a unicast signal. The communication channels 115 may be configured to interface to a smart meter (e.g., the monitoring devices 102*a*-102*n*), a thermostat (e.g., the climate control device 103*a*-103*n*), a customer's mobile device, a data exchange interface of a cellular network, and other networks.

In operation, the energy usage alert system 100 allows for the analysis of usage data 105 associated with a user to determine a projected consumption or usage cost for the user, which may be stored as information in the projected use data 107. The projected consumption cost can indicate an expected monetary cost that the user will be required to pay for resource consumption during a specified time period (e.g., an amount of days, an amount of weeks, an amount of months, etc.). If it is determined that the projected consumption cost exceeds a threshold consumption cost indicating that the projected consumption cost of the user will be high, the user can be provided with one or more use reports notifying the user that the user's projected consumption cost will be high for the time period. The use reports can warn the user that a high bill should be expected, thereby reducing bill shock and ensuing call center calls. As used herein, a bill may be considered "high" based on a threshold amount or percentage above a predetermined amount. Such a predetermined amount may be based on an average bill for the user from that same or similar time period (e.g., using historical usage data) among other factors. In an embodiment, a baseline or comparison period could include the following:

- The same time last year, which takes into account annual weather patterns
- The last bill period
- A similar season
- A dissimilar season As used herein, the phrase "bill shock" may refer to a sudden and unexpected increase in a bill for a period of time ("bill period") that may cause surprise when a user or individual receives that bill having the amount higher than expected to be paid. One way to prevent the bill shock from occurring is to use a behavioral lever of reminders to inform customers of what they are projected to spend at the end of a period of time that represents the bill period and better explain the factors that influence their bill. Preventing bill shock from happening in the first place can reduce call center volume and increase the operational efficiency of a utility or energy provider. In this regard, there are at least two critical moments in a customer's lifecycle with their energy provider, which can be leveraged to reduce calls associated with bill shock. A first moment, in an example, may be a mid-way through their bill period, when the customer is on track for a high bill. It is appreciated, however, other times can be used such as any time between the beginning of the bill period and the end of the bill period. A second moment is when the bill is ready for payment. In an example where the bill period is a month (e.g., 4 weeks), halfway through the bill period could be a period of two weeks for the first moment, and the last day of the month could represent the second moment (or some time after or even before the last day of the month when a bill could be considered ready for payment). It is appreciated that other periods of time may be used and still be within the scope of the subject technology.

The first moment can be leveraged by the energy usage alert system 100 to provide the customer with an early warning/reminder that they are on track for a high bill. A reminder may make the actual event more salient and encourage savings, and coupling this with personalized bill analysis can reduce the act of "shock" from happening in the first place and ultimately reduce call center volume. By giving the customer advanced notice that they may be on track for a high bill may also enable the customer to take action and reduce usage for the remaining bill period and thus avoid or mitigate a high bill.

The aforementioned second moment for notifying a user can occur once the customer's or user's bill is ready for payment. Once the customer receives their bill, the customer may be susceptible to bill shock and may call into the call center to complain about the high bill or to understand why their bill was high. A bill arrival notification provided by the energy usage alert system 100 would notify the customer that their bill is ready for payment, provide a personalized explanation of the cost/consumption and promote payment of the bill through online billing.

In some aspects, the energy usage alert system 100 takes into account of changes in weather data, e.g., from a past period (from which a comparison is made) and a current/near future time, for which the projection is made. As illustrated, the energy usage alert system 100 may receive weather data from a weather service 120. The weather service 120 may include a weather module 122 that stores information for weather as weather data 124. In an embodiment, the weather service 120 may be third party service in which the energy usage alert system 100 may communicate over a network (not shown) to submit requests for the weather data 124. The weather service 120 may expose an application programming interface (API) to facilitate submission of such requests for the weather data 124. Alternatively, the weather service 120 may be implemented as another set of components included in the energy usage alert system 100.

In an example, a usage notification may be sent if the projected usage increases are directly caused by fluctuations in weather, (e.g., if a particularly hot period is compared to a past temperate period). It may be important to provide an alert to the user in case that unexpected or abnormal fluctuations in weather causes a higher than expected bill. In at least an embodiment, a threshold may be used such that a notification(s) may not be sent if the projected increase in consumption and/or cost does not represent an increase above a certain amount or percentage (e.g., 30%). It is therefore understood that by intelligently tailoring a notification to be sent when considering a threshold amount or an expected increase in usage based at least on weather, the energy usage alert system 100 can decrease or minimize notifications that represent false positives for bill shock. The user may therefore not be notified in cases where bill shock is not likely to occur, which can further improve the experience of the user.

Aspects of the subject technology therefore relate to diagnosing anomalies in user resource usage. In particular, a system may be configured to identify an anomaly or abnormality (e.g., unusually high or low usage) based on a current and/or historical resource usage data. In some aspects, one or more causes of the anomaly can also be identified. Example causes may include weather, resource rate changes, changes in heating or cooling habits, or user activities. Additionally, in some implementations, time periods in which anomalous use occurred may be identified and the user may be prompted to help diagnose the cause. The systems and processes described herein facilitate diagnosing the customer's bill to provide the customer with the single insight (or several insights) that best explains their consumption patterns.

Figure 2:
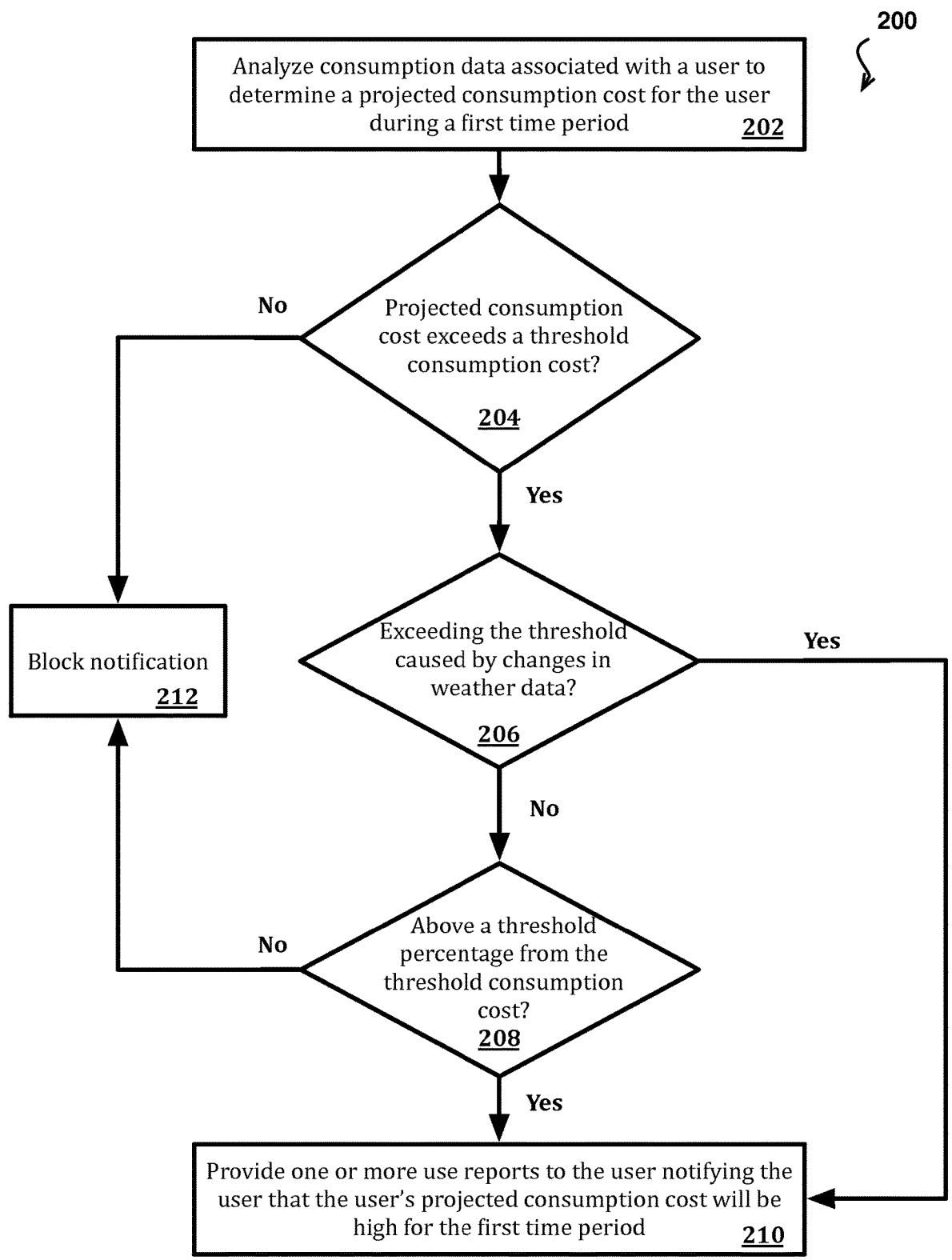
FIG. 2 illustrates a flowchart of an example process for the energy usage alert system described in FIG. 1 to provide use reports to notify a user or customer that their projected consumption cost will be high for a given time period, according to certain aspects of the subject technology.

FIG. 2 illustrates a flowchart of an example process 200 for the energy usage alert system described in FIG. 1 to provide use reports to notify a user or customer that their projected consumption cost will be high for a given time period, according to certain aspects of the subject technology. The example process 200 is provided merely as an example and additional or fewer steps may be performed in similar or alternative orders, or in parallel, within the scope of the various embodiments described in this specification.

At step 202, consumption data associated with a user is analyzed to determine a projected consumption cost for the user. The projected consumption cost indicates an expected monetary cost that the user will be required to pay for resource consumption during a first time period. The first time period may be a bill period (e.g., a month) in which a user's energy consumption is tracked to determine a bill. The consumption data may refer to usage data by a user or customer that occurs in a prior time period, which is used for determining a future energy consumption forecast. In an embodiment, to calculate the projected consumption cost for the first time period, the future energy consumption forecast can be determined based on previous use or consumption data for similar time periods (e.g., seasons, span of weeks or months, etc.) in the past and can take into account weather data (e.g., hot weather, cold weather, etc.) that may affect consumption activity during the first time period. By reference to FIG. 1, the consumption data may be stored in the usage data 105. Further, other factors that may be used in determining the projected consumption cost may include but are not limited to: future weather, parcel information about a home, demographic information about the inhabitants, and/or appliance/technology information that is in the home (e.g., heat type, cooling type, appliances type, etc.).

In at least one embodiment, using AMI interval data, a projected consumption cost may be determined using the following steps. AMI interval data is obtained for a time period that has elapsed in the billing period. An amount of remaining time in the billing period is then determined. AMI interval data may then be identified for the most recent 7 day period available (however, it is appreciated that this time limit may be variable). Weather data is obtained that corresponds to the 7 day period and weather data/forecasts for the remaining billing period. The 7 day information is then projected onto the time remaining in the billing period, taking into consideration the weather and differences in weather between the 7 days and the weather forecast for the remaining billing period. The total consumption cost for the billing period is then calculated. For example, a total consumption cost for the billing period is equal to the interval data for time that has elapsed in the billing period plus the projected usage for the remaining days.

As an illustrative example, if a utility customer is currently at day 16 of a 30 day billing period, the following steps may be performed to determine a projected consumption cost:

1) Obtain AMI interval data for days 1 to 16=X;
2) Calculate that there are only 14 days remaining in the billing period (e.g., 30 days−16 days=14 days)
3) Obtain interval data for the most recent 7 day period=AMI interval data for days 10 to 16=Y
4) Obtain weather data
5) Project that 7 day information (Y) onto the time remaining in the billing period (e.g., 14 days left) →projected usage for the remaining billing period=2Y
6) Calculate total consumption for the billing period=X+2Y. Stated another way, take the sum of the AMI interval data for days 1 to 16 and the projected usage for the remaining billing period.

At step 204, it is determined whether the projected consumption cost exceeds a threshold consumption cost indicating that the projected consumption cost of the user will be high. The threshold consumption cost may be based on historical usage data from the same time period for a year prior to the first time period, or the previous bill period as a baseline, and when a consumption cost exceeds this threshold cost, an indication that the user's bill may be high is provided. In another example, a moving average (e.g., average of last 3 billing periods or n billing periods) may be utilized on consumption cost data over a number of billing periods. If the threshold consumption cost is not surpassed by the projected consumption cost (e.g., less than), at step 212, a notification (e.g., use report or message) may be blocked from being sent to the user (or not sent).

Alternatively, the process 200 continues to step 206 if the projected consumption cost is greater than the threshold consumption cost. At step 206, it is determined whether changes in weather data caused the projected consumption cost to exceed the threshold consumption cost. By reference to FIG. 1, weather data 124 may be received by the energy usage system 100 by making a request with the weather service 120. Using the weather data, if a temperature during the first time period is abnormally colder or hotter than a temperature from a prior time period to the first time period (e.g., beyond a threshold number of degrees difference), at step 210, a notification (e.g., use report or message) that the projected consumption cost will be high for the first time period may be sent to the user. In an example, first weather data corresponding to the first time period may be received, and second weather data corresponding to a prior time period from the first time period may also be received. A determination then may be made that exceeding the projected consumption cost is caused based at least in part on a comparison between the first weather data and the second weather data. Alternatively, the process 200 continues to step 208 if it is determined that the projected consumption cost exceeding the threshold consumption cost was not directly caused by changes to the weather data (e.g., corresponding to fluctuations in weather, such as if a particularly hot period is compared to a past temperate period, etc.).

At step 208, it is determined whether the projected consumption cost is above a threshold percentage of the threshold consumption cost. In an example, the threshold percentage may be a value such as 30% so that the projected consumption cost should be 30% greater than the threshold consumption cost. If not, at step 212, a notification (e.g., use report or message) may be blocked from being sent to the user (or not sent). Alternatively, at step 210, one or more use reports are provided to the user, notifying the user that the projected consumption cost will be high for the first time period.

Figure 3A:
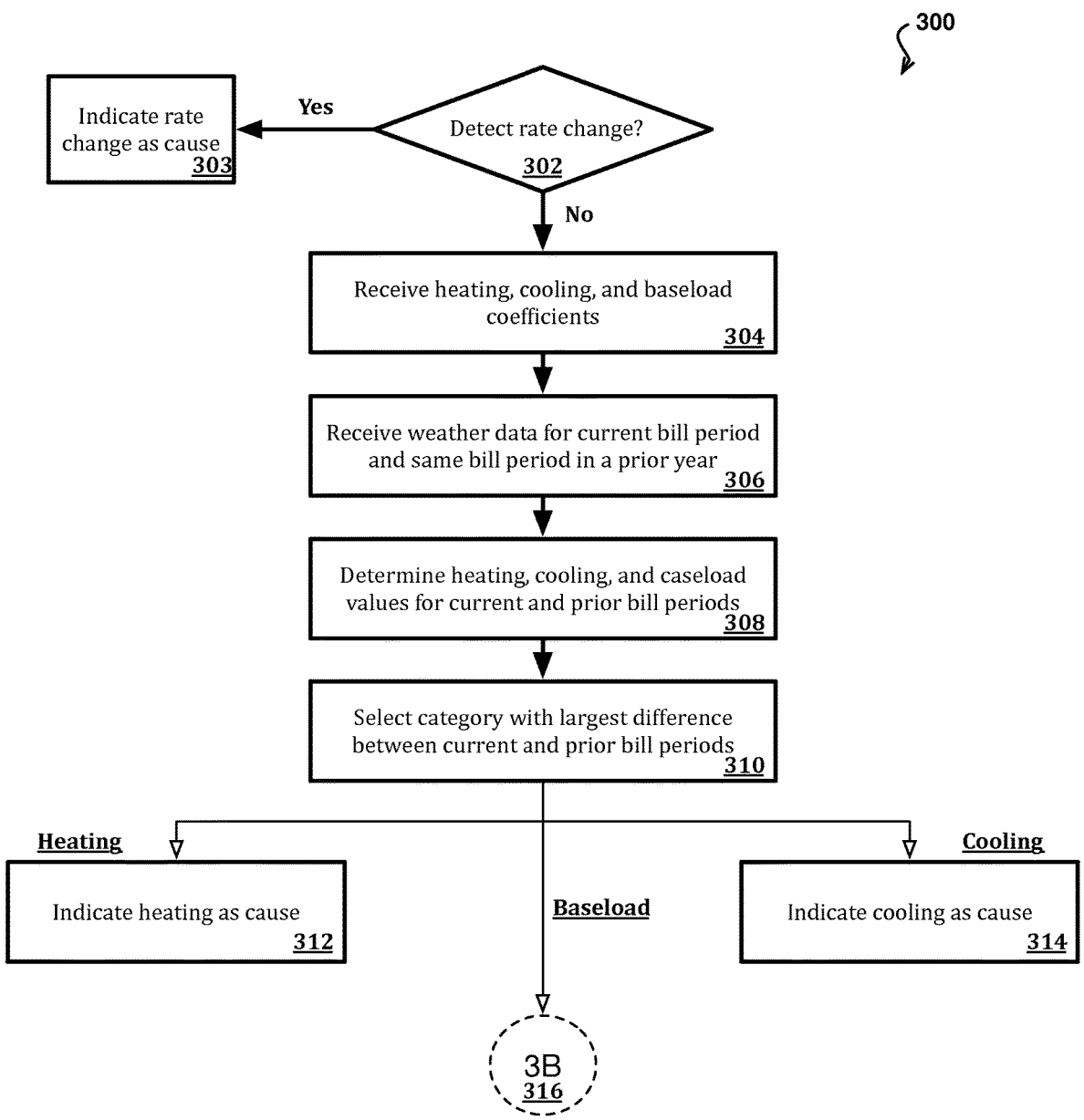
FIG. 3A illustrates a flowchart of an example process for diagnosing a utility bill in the energy usage alert system described in FIG. 1, according to certain aspects of the subject technology.

FIG. 3A illustrates a flowchart of an example process 300 for diagnosing a utility bill in the energy usage alert system described in FIG. 1, according to certain aspects of the subject technology. The example process 300 is provided merely as an example and additional or fewer steps may be performed in similar or alternative orders, or in parallel, within the scope of the various embodiments described in this specification.

By sending personalized analysis through notifications at the pre-bill and bill arrival moments, the number of calls associated with bill shock can be reduced and can further promote online payment of the bill, ultimately improving the utility's operational efficiency. The system described herein facilitates diagnosing the customer's bill to provide the customer with the single insight that best explains their consumption patterns. To this end, the following bill diagnosis process can be used by the system as illustrated in FIG. 3A.

At step 302, it is determined whether a rate change caused the projected consumption cost to exceed the threshold consumption cost for the aforementioned first time period discussed in FIG. 2. If so, at step 303, the rate change or changes is indicated as being the cause of the high bill. To this end, if a rate change(s) causes a high bill, an explanation may be provided by the system to describe what happened. For example, at least one use report may be provided with an indication that the rate change caused the projected consumption cost to exceed the threshold consumption cost.

Alternatively, at step 304, heating, cooling, and baseload coefficients may be received or calculated. In an embodiment, the heating, cooling, and baseload coefficients may be AMI-based. Heating and cooling coefficients, in an embodiment, correspond to values related to climate control energy use, and baseload coefficients correspond to values related to non-climate control energy use. In embodiments of the present invention, the non-climate control coefficient is representative of the non-climate control energy usage for the building (e.g., energy used for entertainment, cooking, and lighting). For example, the non-climate control coefficient for a given building may be 24 kwh/day. This means that, when the building is not being heated or cooled, the building uses an average of 24 kwh of electricity per day for activities that are unrelated to climate control and outside temperature change. On the other hand, the cooling coefficient and heating coefficient are representative of the building's sensitivity to changes in outside temperature. In other words, the cooling coefficient and heating coefficient model the amount of energy necessary to cool or heat the building given a particular outdoor temperature.

Further, the non-climate control coefficient, cooling coefficient, and heating coefficient may be building specific and, therefore, are calculated separately for each building. This is so because one building's sensitivity to outdoor temperature may be less than another's. For example, one household may have an efficient HVAC system with well insulated walls and windows, whereas another household may have an outdated cooling and heating system with poorly insulated walls and windows. Furthermore, one building's non-climate control energy use may be different than another building's non-climate control energy use. For example, one household may leave appliances on for the entire day, whereas another household may be more diligent in turning appliances off when not in use.

In an example, the heating, cooling, and baseload coefficients may be calculated using the following techniques. A series of building energy use values (e.g., AMI-based usage data) and corresponding outdoor temperature values (e.g., based on weather data) may be received. A series of temperature difference values for a time period is then determined based on a difference in temperature between a baseline temperature and each of the outdoor temperature values. In some embodiments, a baseline temperature is a predetermined temperature that is generally comfortable to humans (e.g., room temperature). Thus, in some embodiments, the baseline temperature may have a value between 55° F. and 75° F. However, a comfortable baseline temperature can vary based on geography (e.g., different for humid and dry climates), in one example, the baseline temperature is 65° F. for both the cooling degree values and the heating degree values. However, in other embodiments, the baseline temperature for the cooling degree values and the heating degree values is different. For example, the baseline temperature for heating degree values may be 60° F. (heating baseline temperature) and the baseline temperature for cooling degree values may be 70° F. (cooling baseline temperature). Such a model assumes that moderate outdoor temperatures between 60° F. and 70° F. would not lead to heating or cooling energy usage.

A series of temperature difference values may include cooling degree values and heating degree values. The cooling degree values are determined by subtracting the baseline temperature from outdoor temperatures that are above the baseline temperature, while the heating degree values are determined by subtracting outdoor temperatures, that are below the baseline temperature, from the baseline temperature. Once the temperature difference values (e.g., heating degree values and/or cooling degree values) are determined, a regression analysis may be used to determine a non-climate control coefficient (e.g., a baseload coefficient) and a climate control coefficient (e.g., heating and cooling coefficients) from the energy use values and temperature difference values. For example, energy use values from may be plotted against the heating and cooling temperature difference values using an ordinary least squares regression analysis to generate respective first and second lines on a graph where energy use values appear on the vertical axis and the temperature difference values appear on the horizontal axis. In this example, the slope of the first line represents the heating coefficient (e.g., X kwh/degree) and the slope of the second line represents the cooling coefficient (e.g., Y kwh/degree), and the intercept of both lines at the vertical axis represents the non-climate control coefficient (e.g., Z kwh/day).

At step 306, weather data for current bill period (e.g., first time period) and the same bill period last year (e.g., prior time period) are received. At step 308, the following values may be determined: a first heating value, a first cooling value, and a first baseload value for the first time period and a second heating value, a second cooling value, and a second baseload value for a prior time period from the first time period. The prior time period may be a year before the first time period in an example. Differences or deltas between corresponding values may then be determined. For example, the following values may be determined: a first difference value between the first heating value and the second heating value; a second difference value between the first cooling value and the second cooling value; and a third difference value between the first baseload value and the second baseload value. At step 310, a largest difference value among the first difference value, the second difference value, and the third difference value may be selected as a chosen category.

If heating had the biggest change, then the user may be notified that the bill is higher because there were more heating degree day(s) this year than last year (or prior) and their home or place of residence is sensitive to cold weather.

In an embodiment, a heating coefficient represents how sensitive a home is to changes in the weather or ground temperature. The temperature (e.g., heating degree day or cooling degree day) may then be applied to the aforementioned coefficients to estimate usage. At step 312, in at least one use report, an indication that an increase in a heating degree day (HDD) caused the projected consumption cost to exceed the threshold consumption cost is provided. A heating degree day (HDD) is a measurement designed to reflect the demand for energy needed to heat a building and may be derived from measurements of outside air temperature. The indication at step 312 may be responsive to the largest difference value being the first difference value at step 310.

If cooling had the biggest change, then the user may be notified that the bill is higher because there were more cooling degree day(s) this year than last year (or prior). A cooling degree day (CDD), reflects the amount of energy used to cool a building. At step 314, in at least one use report, an indication that an increase in a cooling degree day (CCD) caused the projected consumption cost to exceed the threshold consumption cost is provided. The indication at step 314 may be responsive to the largest difference value being the second difference value at step 310.

If baseload had the biggest changes proceed to next diagnosis step 316 which continues to FIG. 3B described further below. Baseload may refer to the minimum level of demand on an electrical supply system over a time period (e.g., 24 hours). Responsive to the to the largest difference value being the third difference value, in at least one use report, an indication that a change in a baseload value caused the projected consumption cost to exceed the threshold consumption cost is provided. The indication may be responsive to the largest difference value being the second difference value at step 310.

Figure 3B:
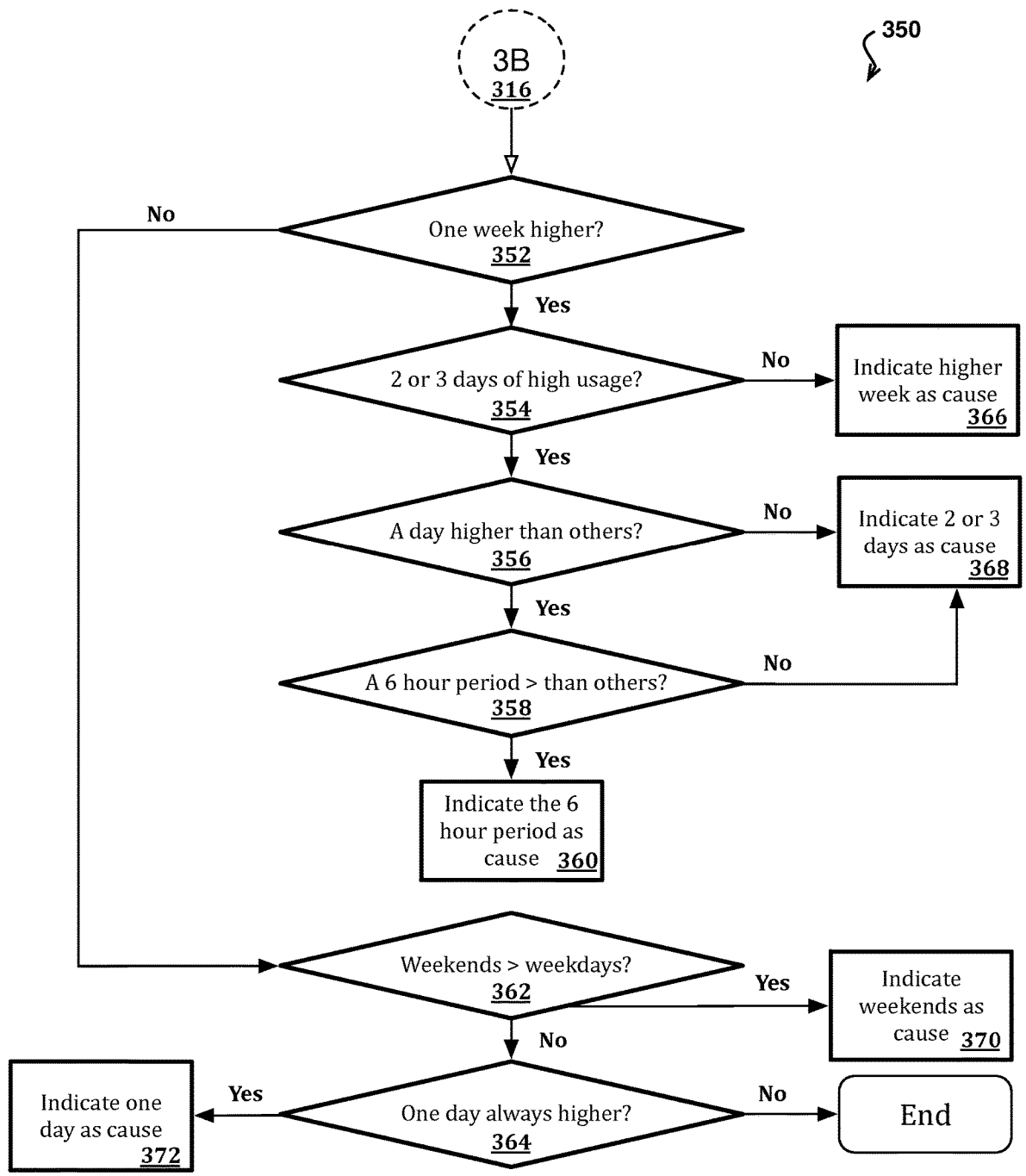
FIG. 3B illustrates a flowchart of an example process for diagnosing a utility bill to determine a behavioral trend using the energy usage alert system described in FIG. 1, according to certain aspects of the subject technology.

FIG. 3B illustrates a flowchart of an example process 350 for diagnosing a utility bill to determine a behavioral trend using the energy usage alert system described in FIG. 1, according to certain aspects of the subject technology. In an embodiment, the process 350 may be performed conjunctive with the process 300 in FIG. 3A (e.g., continuing from 316). The example process 300 is provided merely as an example and additional or fewer steps may be performed in similar or alternative orders, or in parallel, within the scope of the various embodiments described in this specification.

At step 352, it is determined if a respective week time period is more than a threshold amount higher in resource consumption than each other week time period from the first time period. At step 354, it is determined if two or three consecutive days from the respective week time period is high in resource consumption based on a threshold resource consumption value. If not, at step 366, in at least one use report, an indication is provided that the respective week time period being higher in resource consumption than each other week time period caused the projected consumption cost to exceed the threshold consumption cost. Further the use report may include an inquiry to the customer to explain why the respective week time period had higher resource consumption than other weeks.

Alternatively, at step 356, it is determined if a respective day from the two or three consecutive days is higher in resource consumption than other days from the two or three consecutive days. If not, at step 368, in at least one use report, an indication is provided that the respective day from the two or three consecutive days is higher in resource consumption than other days from the two or three consecutive days caused the projected consumption cost to exceed the threshold consumption cost. Further the use report may include an inquiry to the customer to explain why the respective day from the two or three consecutive days had higher resource consumption than other days.

Alternatively, at step 358, it is determined if a respective six hour time period from the respective day is higher in resource consumption than other six hour time periods from the respective day. If not, at step 368, in at least one use report, an indication is provided that the respective day from the two or three consecutive days is higher in resource consumption than other days from the two or three consecutive days caused the projected consumption cost to exceed the threshold consumption cost. Further the use report may include an inquiry to the customer to explain why the respective day from the two or three consecutive days had higher resource consumption than other days. Alternatively, at step 360, in at least one use report, an indication that the respective six hour time period caused the projected consumption cost to exceed the threshold consumption cost is provided.

Referencing back to step 352, the process 350 may continue to step 362 if it is not determined that a respective week time period is higher in resource consumption than each other week time period from the first time period. At step 362, it is determined if weekends are higher in resource consumption than weekdays from the first time period. If so, at step 370, in at least one use report, an indication that the weekends caused the projected consumption cost to exceed the threshold consumption cost is provided. Alternatively, at step 364, it is determined if one day of the week was always higher than the other days from the first time period. If so, at step 372, in at least one use report, an indication that the one day caused the projected consumption cost to exceed the threshold consumption cost is provided. Otherwise, the process 350 may end.

Although the foregoing implementation relates to energy usage reduction, other measures may also be used to rank similar users with respect to consumption of various goods or services. For example, BDR notifications can be used to notify users of reductions in aggregate usage levels of other resources (e.g., natural gas, water, etc.). By way of example, based on a particular user's energy use reduction, the user may be provided with a notification of an amount of water or natural gas conserved.

Further, in some embodiments, the following steps may be performed by an example process for providing a bill notification according to aspects of the subject technology. After a first time period has elapsed, consumption data associated with a user is analyzed to determine a consumption cost for the user, the consumption cost indicating a monetary cost that the user will be required to pay for resource consumption during the first time period, the first time period being a period of time in which the user's energy consumption is tracked to determine a bill. It is determined that the consumption cost exceeds a threshold consumption cost, the threshold consumption cost being determined based at least in part on historical consumption cost data. One or more use reports are provided to the user notifying the user that the consumption cost is high for the first time period. In some embodiments, the threshold consumption cost is further based on historical weather data including at least one past temperature during a prior time period, the historical weather data indicating a difference in weather data representing at least one temperature during the first time period in comparison to the historical weather data including the at least one past temperature.

Additionally, providing one or more use reports to the user may further include: determining whether a rate change caused the consumption cost to exceed the threshold consumption cost; and providing, in at least one use report, an indication that the rate change caused the consumption cost to exceed the threshold consumption cost. In another example, providing one or more use reports to the user further includes: receiving historical consumption cost data for at least one prior past time period; generating, using at least the historical consumption data, a graphical representation of the historical consumption data; and providing, in at least one use report, the graphical representation of the historical consumption data. In another example, in at least one use report, an indication that an increase in consumption corresponding to a heating caused the consumption cost to exceed the threshold consumption cost is provided. In a further example, in at least one use report, an indication that an increase in consumption corresponding to cooling caused the consumption cost to exceed the threshold consumption cost is provided.

Figure 4A:
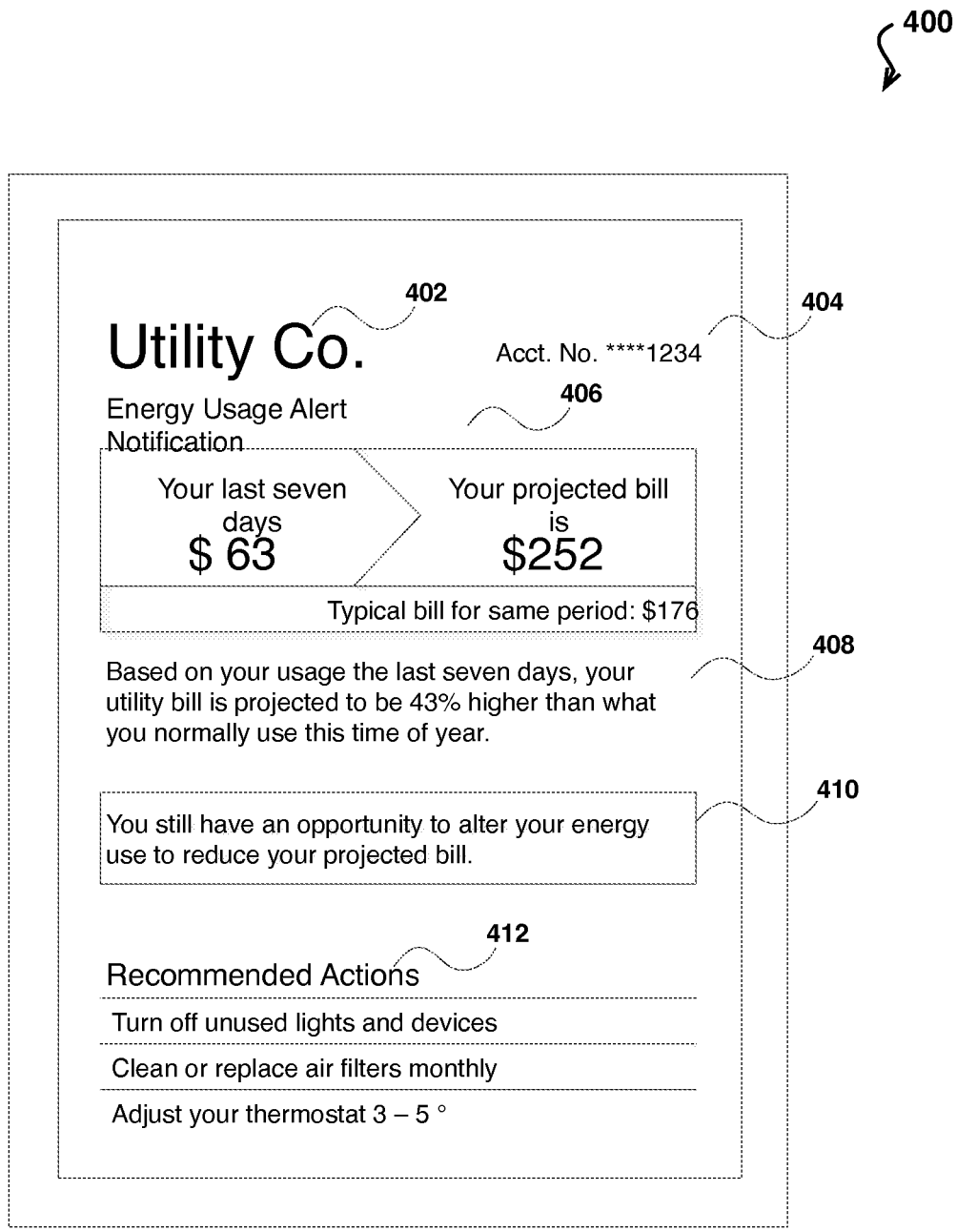
FIG. 4A illustrates an example of an energy usage alert notification, according to certain aspects of the subject technology.

FIG. 4A illustrates an example of an energy usage alert notification 400, according to certain aspects of the subject technology. The energy usage alert notification 400 includes a utility identifier 402, an account number 404, an alert title 406, a report analysis 408, a report message 410, and a recommendation portion 412. The energy usage alert notification 400 is provided merely as an example and additional or fewer features may be included in similar or alternative formats within the scope of the various embodiments described in this specification.

The utility identifier 402 may relate to the utility company associated with the generation of the energy usage alert notification 400. The utility identifier 402 may include a name of the utility company, an address for the utility company, and/or contact information for the utility company.

The account number 404 may relate to the corresponding utility customer subscribed to receive energy usage alerts such as the energy usage alert notification 400. For privacy reasons, the account number 404 may be limited to a subset of numbers that, at least in part, identify the utility account. In an aspect, the account number 404 is displayed in its entirety.

The alert title 406 provides an identification of the type of notification contained in the energy usage alert notification 400. For example, the alert title 406 may relate to a power conservation alert where the notification 400 provides the utility customer an indication on how to save energy and/or money for the current billing period. In this respect, the energy usage alert notification 400 may be sent to the utility customer before the end of the current billing period to allow the utility customer sufficient time to make certain adjustments to current climate control settings of the corresponding property.

The report analysis 408 may include information relating to how the current projected bill compares to prior utility bills, and may include a metric to give the utility customer some context to the current projected bill. The report analysis 408 may include additional metrics such as a chart to provide the utility customer a visual analysis of the current projected bill.

The report message 410 may include an indication to the utility customer that the projected bill can still be altered if certain adjustments can be made prior to the end of the current billing period. The report message 410 also may include other report messages relating to the current projected bill such as usage information relating to specific components of the property and/or rate information over the duration of the current billing period.

The recommendation portion 412 may include recommendations on how to modify usage so that actual usage can remain within the budgeted use for the specified budget period. The recommendations may include set points or set point schedules that may be used on the climate control device, suggestion to turn off light sources and/or electronic devices, maintenance suggestions, and specific adjustments to the climate control device.

Figure 4B:
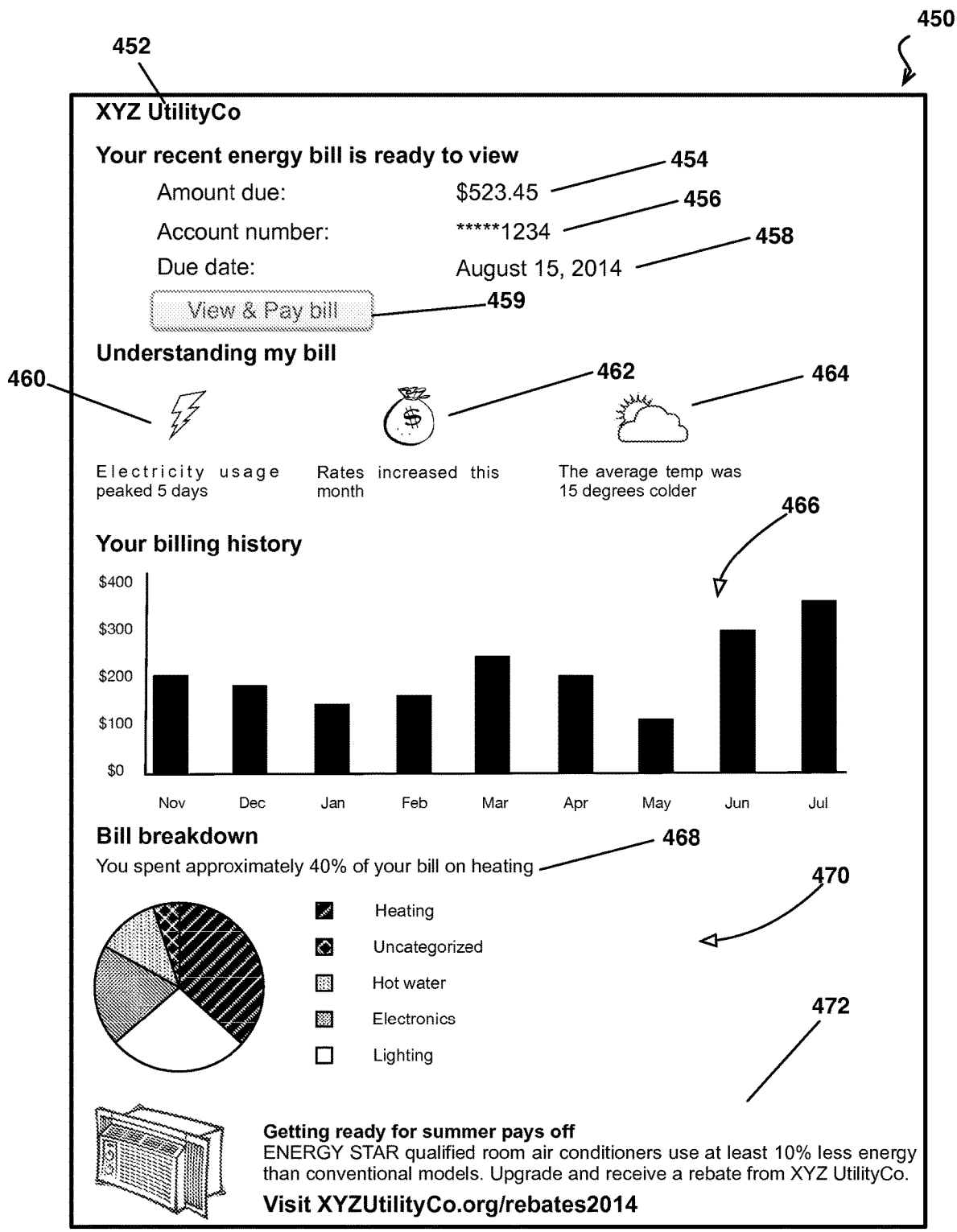
FIG. 4B illustrates an example of a bill arrival notification, according to certain aspects of the subject technology.

FIG. 4B illustrates an example of a bill arrival notification 450, according to certain aspects of the subject technology. At the end of a utility customer's bill period (e.g., 30 days), as soon as a utility bill is generated, the utility customer receives the bill arrival notification 450, that shows, among other information, a balance owed, when payment is due and the factors that influenced the bill. In am embodiment, the utility customer can either "click through" to pay the bill online or access additional analysis of the bill and the utility customer's consumption patterns.

As illustrated, the bill arrival notification 450 includes a utility identifier 452, a bill amount 454, an account number 456, a bill due date 458, a graphical element 459, a bill analysis segment 460, a bill analysis segment 462, a bill analysis segment 464, and a bill history 466, a report message 468, a bill breakdown chart 470, and a second report message 472. The bill arrival notification 450 is provided merely as an example and additional or fewer features may be included in similar or alternative formats within the scope of the various embodiments described in this specification.

The utility identifier 452 may relate to the utility company associated with the generation of the bill arrival notification 450. The utility identifier 450 may include a name of the utility company, an address for the utility company, and/or contact information for the utility company.

The bill amount 454 indicates an amount owed for the bill period, the account number 456 indicates the utility customer's account number, the bill due date 458 indicates a date when the bill amount 454 should be paid, and the graphical element 459 enables the utility customer "click through" (e.g., using mouse, touch, voice and/or keyboard input, etc.) to pay the bill.

The bill analysis segment 460 provides information regarding peak energy usage during the bill period, the bill analysis segment 462 provides information regarding increased rates during the bill period, and the bill analysis segment 464 provides information regarding weather during the bill period. Each of the aforementioned types of information may be factors that affected the energy usage and the consumption cost during the bill period.

The bill arrival notification 450 may include additional metrics such as a chart to provide the utility customer a visual analysis of their energy usage. For example, bill history 466 includes a graphical representation of the energy or consumption cost (e.g., in monetary amounts as shown) of the utility customer over a time period (e.g., a series of months). The report message 468 indicates a percentage that the utility customer may have used corresponding to a type of energy usage (e.g., heating, cooling, etc.) that is associated to the greatest percentage of consumption cost for the bill period. The bill breakdown chart 470 further indicates, as a visual representation (e.g., pie chart), apportionments of different types of energy usage to the aggregate consumption cost for the bill period.

The second report message 472 includes information suggesting to the utility customer that they could save money and receive a rebate by installing an energy efficient appliance(s) (e.g., ENERGY STAR air conditioners), and in an embodiment, may include a hyperlink to an external web site for the utility customer to obtain additional information.

Figure 5:
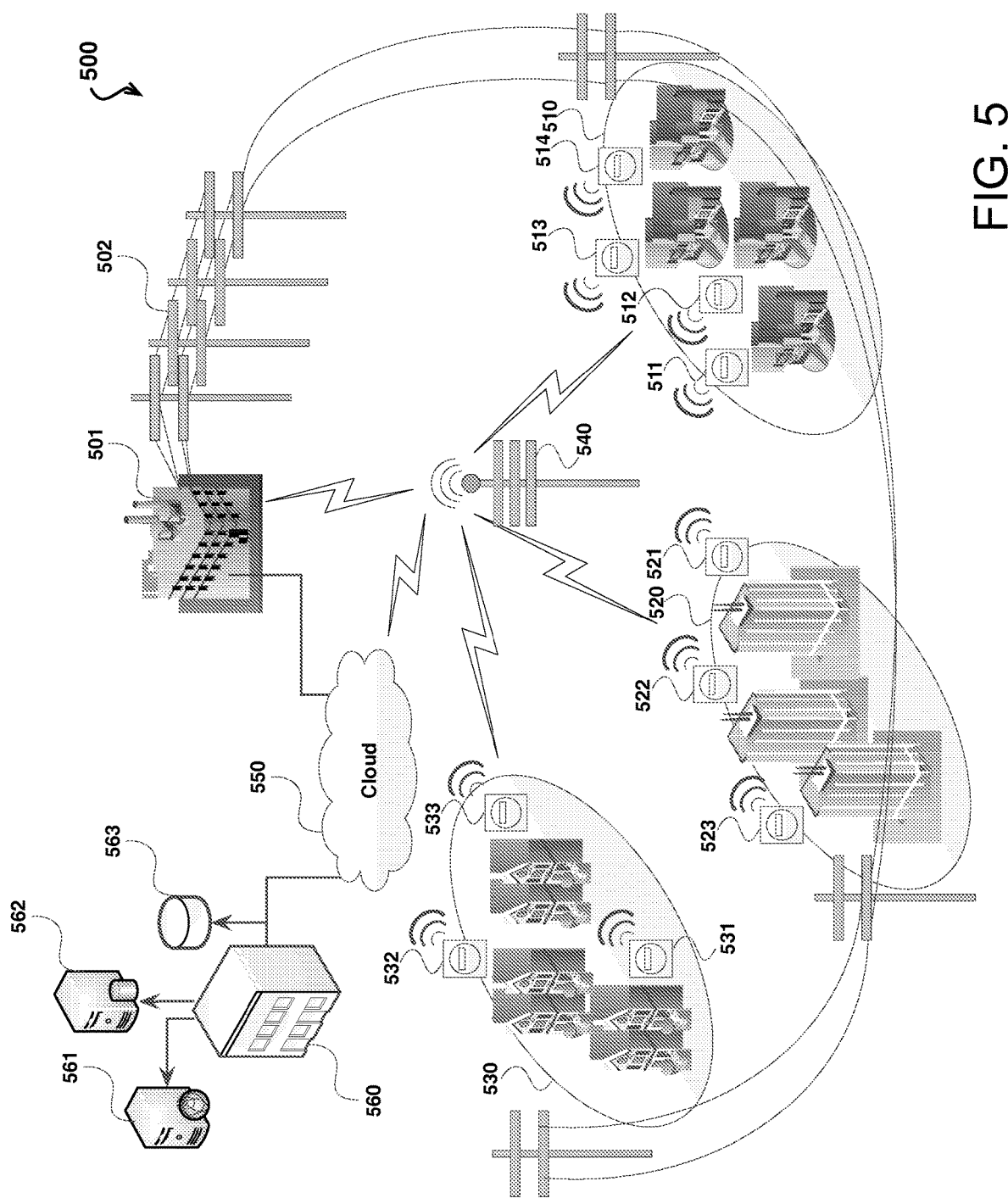
FIG. 5 illustrates an example of an environment for implementing aspects in accordance with various embodiments.

FIG. 5 illustrates an example of an environment 500 for implementing aspects in accordance with various embodiments. The environment 500 includes a utility company 501, power distribution system 502, utility customer regions 510, 520 and 530, energy usage collector 540, a network 550 and a usage alert system 560. The utility customer region 510 includes residential structures with corresponding smart meters 511-514. The utility customer region 520 includes commercial structures with corresponding smart meters 521-523. The utility customer region 530 includes multi-family structures with corresponding smart meters 531-533. The usage alert system 560 includes a web server 561, an application server 562 and a database 563.

The utility company 501 provides a commodity (e.g., electricity, gas, water) to the utility customer regions 510, 520 and 530. The utility company 501 may track the energy usage from each region via a monitoring device (e.g., a smart meter) associated with each structure of the corresponding region. The utility company 501 may receive usage data that includes the amount of energy consumption (e.g., kWH) for the corresponding utility account. In an aspect, the utility company 501 receives the usage data from the energy usage collector 540 via a wireless communication system. In some aspects, the energy usage collector 540 may obtain the usage data by pulling the usage data from each of the smart meter devices. The smart meter devices may broadcast usage data on a periodic or scheduled basis. The utility company 501 also may receive the usage data from each monitoring device through a wired communication system.

The usage alert system 560 is in communication with the utility company 501 via the network 550. The usage alert system 560 may obtain the usage data from the utility company 501 via the network 550. In an aspect, the usage alert system 560 receives the usage data via the network 550. The usage alert system 560 may receive the usage data directly from the smart meter devices.

Each of the utility customer regions 510, 520 and 530 may correspond to a separate geographical location with a respective rate schedule. In some aspects, an energy usage alert notification for a corresponding utility customer in one region may be generated using usage data of similar users in the same region to provide the corresponding utility customer with a comparative analysis of its energy consumption (e.g., current energy usage compared to similar customers in the same zip code or within a certain radius).

The usage alert system 560 also may be in communication with a third party weather service, such as the National Weather Service (not shown). For example, the usage alert system 560 may receive corresponding outdoor temperatures from the third party weather service via the network 550 (e.g., e-mails, downloaded FTP files, and XML feeds). In this respect, the usage alert system 560 may use data from the third party weather service to determine a projected use for a current billing period. For example, forecasted weather conditions (e.g., the temperature, the humidity, the barometric pressure, precipitation, etc.) may indicate that the utility customer's HVAC system is likely to be in greater use. The usage alert system 560 may estimate the projected use for the remaining amount of time of the current billing period, and thereby determine if the utility customer is on pace to exceed the projected bill based on the estimated projected use. In turn, the usage alert system 560 may notify the utility customer through an energy usage alert notification.

The usage alert system 560 communicates the energy usage alert notification to utility customers associated with the utility customer regions 510, 520 and 530. In some aspects, the usage alert system 560 communicates the energy usage alert notification via the network 550. For example, the usage alert system 560 may send the energy usage alert notification in an email or the utility customer may log into the usage alert system 560 (e.g., the web server 561 and/or application server 562) through an associated website to view the disaggregated usage data included in the energy usage alert notification. The usage alert system 560 may send the energy usage information to a printing system so that the energy usage alert notification can be provided to the utility customer via regular mail (e.g., as part of a utility bill). In other embodiments, the energy usage information is communicated back to the utility company 501 such that the utility company 501 can provide the energy usage alert notification to the utility customer.

Figure 6:
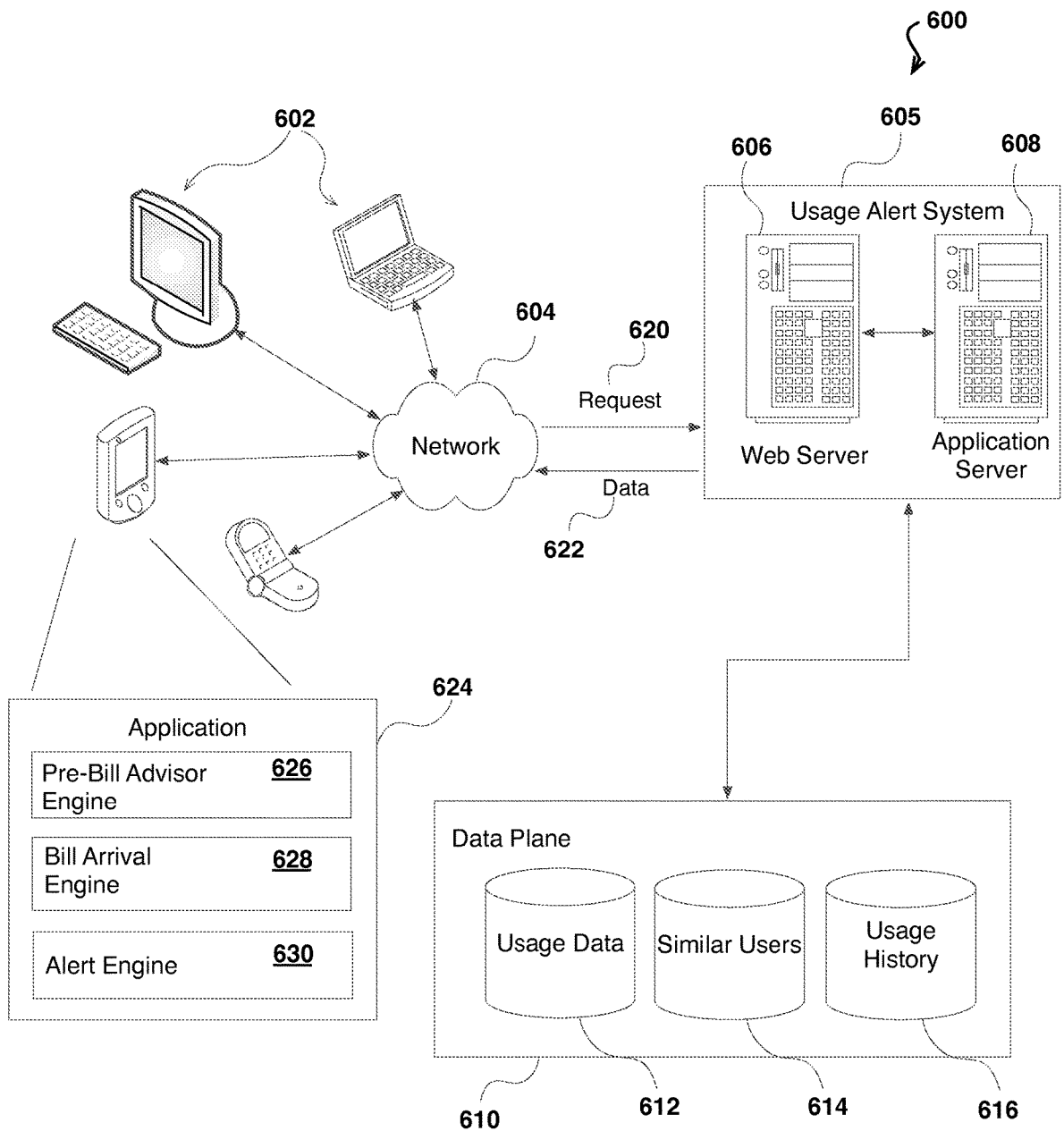
FIG. 6 illustrates an example of a system for energy usage alerts, according to certain aspects of the subject technology.

FIG. 6 illustrates an example of a system 600 for energy usage alerts, according to certain aspects of the subject technology. Although a web-based environment is described for purposes of explanation, different environments may be used, as appropriate, to implement various embodiments.

The example system 600 includes a usage alert system 605 and a data plane 610. The usage alert system 605 includes at least one web server 606 and at least one application server 608, as described below. The usage alert system 605 is an example of an energy usage notification system implemented as computer programs on one or more computers in one or more locations, in which the systems, components, and techniques described below can be implemented.

A user can interact with the usage alert system 605 through a client device 602. For example, the client device 602 can be a computer coupled to the usage alert system 605 through a data communication network 604, e.g., the Internet. In some instances, the usage alert system 605 can be implemented on the client device 602, for example, through a software application executing on the client device 602. The client device 602 generally includes a memory, e.g., a random access memory (RAM), for storing instructions and data, and a processor for executing stored instructions. The client device 602 can be any appropriate device operable to send and receive requests, messages, or other types of information over the data communication network 604. The client device 602 can also include a display screen though which the user interacting with the client device 602 can view information, e.g., energy usage alert notification 300 of FIG. 3. Some examples of client devices include personal computers, smart thermostats, cellular phones, handheld messaging devices, laptop computers, set-top boxes, personal data assistants, electronic book readers, tablet devices, smartphones and the like.

The data communication network 604 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 602 can communicate over the data communication network 604 using wired or wireless connections, and combinations thereof.

A user can use the client device 602 to submit a request 620 to log into the usage alert system 605. The request 620 can request a digital copy of an energy usage alert notification for a corresponding utility account. The energy usage alert notification may include information relating to how much energy has been consumed to date and/or a projected bill amount for a current billing period. The usage alert notification also can include information relating to one or more recommendations for adjusting settings in the property associated with the corresponding utility account such that the projected bill is kept below a target budget for the current billing period. When the user submits the request 620, the request 620 may be transmitted through the data communication network 604 to the application server 608 within the usage alert system 605. The application server 608 responds to the request 620 by using, for example, usage data 612, to identify data 622 describing an energy usage alert with personalized information in response to the request 620. The application server 608 sends the data 622 through the data communication network 604 to the client device 602 for presentation to the user.

The data 622 can include data describing a projected bill for a current billing period. The data 622 can be used, for example, by the client device 602, to generate a local energy usage alert notification with one or more interactive features such as energy consumption adjustments with corresponding utility bill projections and/or instructions for adjusting settings on a climate control device associated with the corresponding utility customer.

After receiving the data 622 from the application server 608, and through the data communication network 604, a software application, e.g., web browser or application 624, running on the client device 602 renders an interactive energy usage alert notification using the data 622. For example, a pre-bill advisor engine 626 in the application 624 can describe the usage to date including a projected use for the current billing period, for display on a display screen of the client device 602.

In some aspects, the application 624 includes a bill arrival engine 628 that is configured to render an interface to the climate control device, and perform one or more actions related to the instructions for adjusting the settings of the climate control device. In some embodiments, the bill arrival engine 628 is configured to obtain data relating to current settings of the climate control device. The bill arrival engine 628 can obtain real-time statistics and/or sensor readings (e.g., thermometer reading) of current climate conditions in the property. In an aspect, the application 624 includes an alert engine 630 that is configured to render the energy usage alert notification including allow the user to set (or program) rules and/or conditions for receiving the energy usage alert notification.

In some embodiments, the web server 606, the application server 608, and similar components, can be considered to be part of the data plane 610. The handling of all requests and responses, as well as the delivery of content between the client device 602 and the application server 608, can be handled by the web server 606. The web server 606 and the application server 608 are merely example components. However, more or fewer components can be used as structured code can be executed on any appropriate device or host machine as discussed elsewhere herein.

The data plane 610 includes one or more resources, servers, hosts, instances, routers, switches, data stores, other similar components, or a combination thereof. The resources of the data plane 610 are not limited to storing and providing access to data. Indeed, there may be several servers, layers, or other elements, processes, or components, which may be chained or otherwise configured, and which can interact to perform tasks including, for example, obtaining data from an appropriate data store. In some embodiments, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 610 can include several separate data tables, databases, or other data storage mechanisms and media for storing data relating to a particular aspect. For example, the data plane 610 illustrated includes mechanisms for storing usage data 612 and user information 616, which can be used to generate the energy usage alert notification. The data plane 610 is also shown to include a mechanism for storing similar user data 614, which can be used for purposes such as reporting a comparative analysis of the usage data for the corresponding utility customer. The data plane 610 is operable, through logic associated therewith, to receive instructions from the application server 608 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 6. Thus, the system 600 in FIG. 6 is provided merely as one example, and does not limit the scope of the disclosure.

Figure 7:
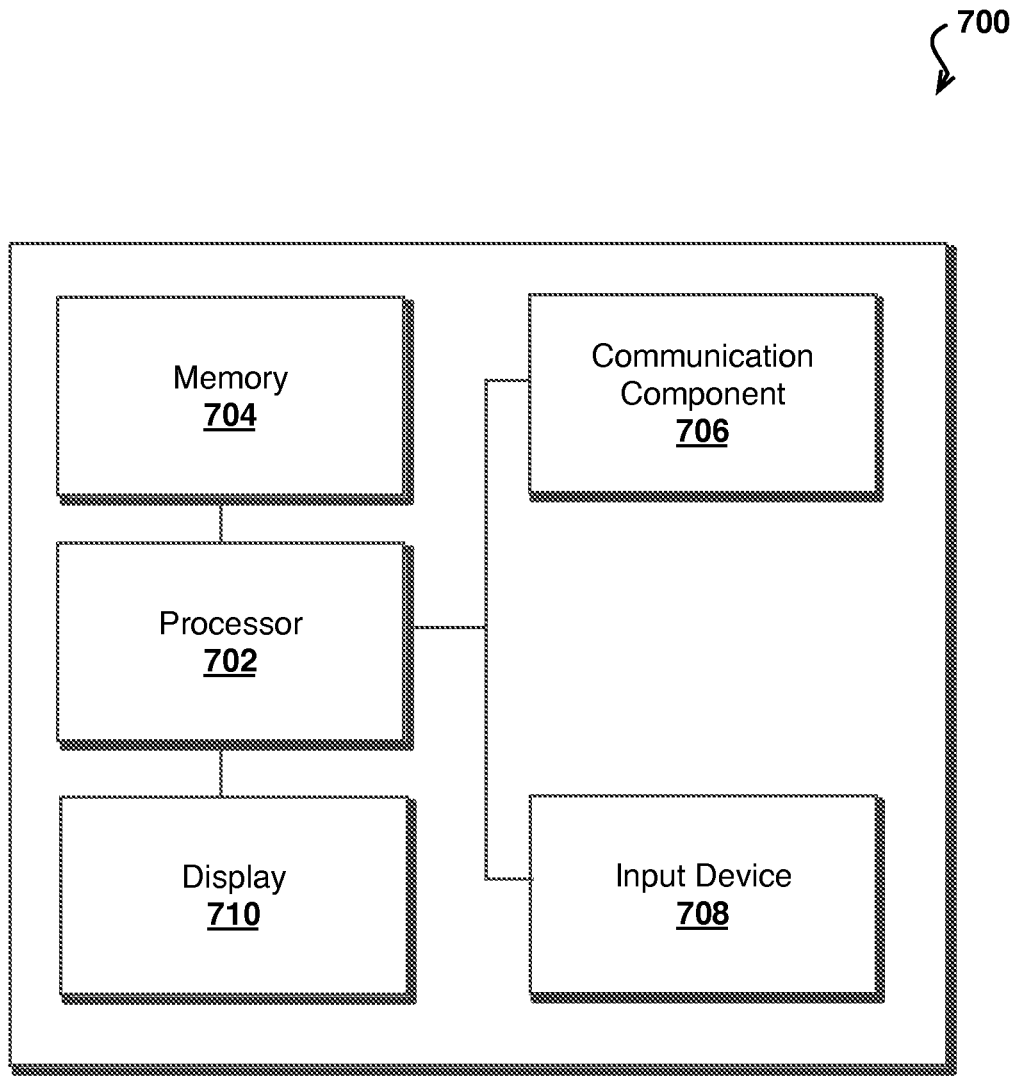
FIG. 7 illustrates an example configuration of components of a computing device, according to certain aspects of the subject technology.

FIG. 7 illustrates an example configuration of components of a computing device 700, e.g., the climate control devices 103a-103n of FIG. 1, according to certain aspects of the subject technology. In this example, the computing device 700 includes a processor 702 for executing instructions that can be stored in a memory device or element 704. The instructions may cause the computing device 700 to execute a computer-implemented method for processing energy usage alerts from the energy usage alert system 100 (FIG. 1) and/or receive instructions to automatically adjust settings (e.g., temperature settings, alarm settings, power settings) of the client computing device 700. As would be apparent to one of ordinary skill in the art, the computing device 700 can include many types of memory, data storage, or non-transitory computer-readable storage media, such as a first data storage for program instructions for execution by the processor 702, a separate storage for usage history or user information, a removable memory for sharing information with other devices, etc. In some embodiments, the computing device 700 can include one or more communication components 706, such as a Wi-Fi, Bluetooth®, radio frequency, near-field communication, wired, or wireless communication system. The computing device 700 in many embodiments can communicate with a network, such as the Internet, and may be able to communicate with other such devices (e.g., the energy usage alert system 100, other climate control devices). As discussed, the computing device 700 in many embodiments will include at least one input element 708 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The computing device 700 includes some type of display element 710, such as a touch screen or liquid crystal display (LCD).

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented method for providing an advanced bill notification, the method comprising:
   obtaining, by a computer processor from a monitoring device through a data communication network, consumption data associated with a user;
   analyzing, by the computer processor, the consumption data to determine a projected consumption cost for the user, the projected consumption cost indicating an expected monetary cost that the user will be required to pay for resource consumption during a first time period;
   determining, by the computer processor, that the projected consumption cost exceeds a threshold consumption cost indicating that the projected consumption cost is greater than a prior monetary cost for resource consumption during a prior time period before the first time period;
   determining, by the computer processor, (i) a first heating value, a first cooling value, and a first baseload value for the first time period and (ii) a second heating value, a second cooling value, and a second baseload value for the prior time period;
   determining, by the computer processor, a first difference value between the first heating value and the second heating value;
   determining, by the computer processor, a second difference value between the first cooling value and the second cooling value;
   determining, by the computer processor, a third difference value between the first baseload value and the second baseload value;

selecting, by the computer processor, a largest difference value among the first difference value, the second difference value, and the third difference value as a basis for diagnosis of energy usage;

generating, by the computer processor, an electronic message including
(i) a notification of the projected consumption cost, and
(ii) an instruction to automatically adjust settings to modify resource consumption associated with the largest difference value; and transmitting, by the computer processor through the data communication network, the electronic message to a client device associated with the user to cause the instruction to be performed and resource consumption to be modified.

2. The computer-implemented method of claim 1, further comprising:
receiving, by the computer processor, first weather data corresponding to the first time period;
receiving, by the computer processor, second weather data corresponding to the prior time period;
determining, by the computer processor, that exceeding the projected consumption cost is caused based at least in part on a comparison between the first weather data and the second weather data;
identifying, by the computer processor,
(i) based on the largest difference value being the first value, that the user's building is sensitive to cold weather, or
(ii) based on the largest difference value being the third value, that the user's building is sensitive to hot weather; and
including, by the computer processor, in the electronic message
(i) a notification that the projected consumption cost will be high for the first time period based at least in part on the comparison between the first weather data and the second weather data, and
(ii) a notification of the identified sensitivity.

3. The computer-implemented method of claim 2, wherein the first weather data indicates a first temperature value associated with the first time period, the second weather data indicates a second temperature value associated with the prior time period, and the first temperature value is different from the second temperature value.

4. The computer-implemented method of claim 1, further comprising:
determining, by the computer processor, that the projected consumption cost is below a threshold percentage above the projected consumption cost; and
blocking, by the computer processor, the generating or the transmitting of the electronic message.

5. The computer-implemented method of claim 1, wherein providing one or more use reports to the user further comprises:
determining, by the computer processor, whether a rate change caused the projected consumption cost to exceed the threshold consumption cost; and
providing, in the electronic message, an indication that the rate change caused the projected consumption cost to exceed the threshold consumption cost.

6. The computer-implemented method of claim 1, further comprising:
providing, in the electronic message, an indication that an increase in a heating degree day (HDD) caused the projected consumption cost to exceed the threshold consumption cost responsive to the largest difference value being the first difference value.

7. The computer-implemented method of claim 1, further comprising:
providing, in the electronic message, an indication that an increase in a cooling degree day (CCD) caused the projected consumption cost to exceed the threshold consumption cost responsive to the largest difference value being the second difference value.

8. The computer-implemented method of claim 1, further comprising:
providing, in the electronic message, an indication that a change in a baseload value caused the projected consumption cost to exceed the threshold consumption cost responsive to the largest difference value being the third difference value.

9. The computer-implemented method of claim 8, wherein providing, in at least one use report, the indication that the change in the baseload value caused the projected consumption cost to exceed the threshold consumption cost, further comprises:
determining, by the computer processor, if a respective week time period is higher in resource consumption than each other week time period from the first time period;
determining, by the computer processor, if two or three consecutive days from the respective week time period is high in resource consumption based on a threshold resource consumption value;
determining, by the computer processor, if a respective day from the two or three consecutive days is higher in resource consumption than other days from the two or three consecutive days;
determining, by the computer processor, if a respective six hour time period from the respective day is higher in resource consumption than other six hour time periods from the respective day; and
providing, in the electronic message,
(i) an indication that the respective six hour time period caused the projected consumption cost to exceed the threshold consumption cost, and
(ii) a request that the user indicate the cause of the high resource consumption.

10. The computer-implemented method of claim 1 wherein (i) the first heating value, the first cooling value, and the first baseload value for the first time period represent a resource consumption by the user during the first time period, and (ii) the second heating value, the second cooling value, and the second baseload value for the prior time period represent a resource consumption by the user during the prior time period.

11. The computer-implemented method of claim 1 wherein the instruction to modify resource consumption is an instruction to automatically adjust a setting of a climate control device.

12. The computer-implemented method of claim 1 wherein the instruction to modify resource consumption is configured to cause the client device to generate a local energy usage alert notification that shows one or more energy consumption adjustments with one or more corresponding utility bill projections.

13. The computer-implemented method of claim 1 wherein the instruction to modify resource consumption includes one or more set points and is configured to cause a setting of a climate control device to be adjusted in accordance with the one or more set points.

14. A computing device for energy usage alerts, the computing device comprising:
at least one processor; and
memory storing instructions that, when executed by the at least one processor, cause the computing device to:
obtain, from a monitoring device through a data communication network, consumption data associated with a user;
analyze the consumption data to determine a projected consumption cost for the user, wherein the projected consumption cost indicates an expected monetary cost that the user will be required to pay for resource consumption during a first time period;
determine that the projected consumption cost exceeds a threshold consumption cost indicating that the projected consumption cost is greater than a prior monetary cost for resource consumption during a prior time period before the first time period;
determine (i) a first heating value, a first cooling value, and a first baseload value for the first time period and (ii) a second heating value, a second cooling value, and a second baseload value for the prior time period;
determine a first difference value between the first heating value and the second heating value;
determine a second difference value between the first cooling value and the second cooling value;
determine a third difference value between the first baseload value and the second baseload value;
select a largest difference value among the first difference value, the second difference value, and the third difference value as a basis for diagnosis of energy usage;
generate an electronic message including
(i) a notification of the projected consumption cost; and
(ii) an instruction to automatically adjust settings to modify resource consumption associated with the largest difference value; and
transmit through the data communication network the electronic message to a client device associated with the user to cause the instruction to be performed and the resource consumption to be modified.

15. The computing device of claim 14, wherein the instructions further cause the computing device to:
receive first weather data corresponding to the first time period;
receive second weather data corresponding to the prior time;
determine that exceeding the projected consumption cost is caused changes based at least in part on a comparison between the first weather data and the second weather data; and
include in the electronic message a notification that the projected consumption cost will be high for the first time period based at least in part on the comparison between the first weather data and the second weather data.

16. The computing device of claim 15, wherein the first weather data indicates a first temperature value associated with the first time period, the second weather data indicates a second temperature value associated with the prior time period, and the first temperature value is different from the second temperature value.

17. The computing device of claim 14, wherein the instructions further cause the computing device to:
determine that the projected consumption cost is below a threshold percentage above the projected consumption cost; and
block the generating or the transmitting of the electronic message.

18. The computer-implemented method of claim 14, wherein the instructions further cause the computing device to:
determine whether a rate change caused the projected consumption cost to exceed the threshold consumption cost; and
provide, in the electronic message, an indication that the rate change caused the projected consumption cost to exceed the threshold consumption cost.

19. The computing device of claim 14, wherein the instructions further cause the computing device to:
provide, in the electronic message, an indication that an increase in a heating degree day (HDD) caused the projected consumption cost to exceed the threshold consumption cost responsive to the largest difference value being the first difference value.

20. The computing device of claim 14, wherein the instructions further cause the computing device to:
provide, in the electronic message, an indication that an increase in a cooling degree day (CCD) caused the projected consumption cost to exceed the threshold consumption cost responsive to the largest difference value being the second difference value.

21. The computing device of claim 14, wherein the instructions further cause the computing device to:
provide, in the electronic message,
(i) an indication that a change in a baseload value caused the projected consumption cost to exceed the threshold consumption cost responsive to the largest difference value being the third difference value, and
(ii) an inquiry requesting that the customer explain the change in baseload value.

22. A non-transitory computer readable storage medium storing instructions for usage alerts on a computing device, the instructions when executed by a processor causing the processor to:
obtain, from a monitoring device through a data communication network, consumption data associated with a user;
analyze the consumption data to determine a projected consumption cost for the user, wherein the projected consumption cost indicates an expected monetary cost that the user will be required to pay for resource consumption during a first time period;
determine that the projected consumption cost exceeds a threshold consumption cost indicating that the projected consumption cost is greater than a prior monetary cost for resource consumption during a prior time period before the first time period;
determine (i) a first heating value, a first cooling value, and a first baseload value for the first time period and (ii) a second heating value, a second cooling value, and a second baseload value for the prior time period;
determine a first difference value between the first heating value and the second heating value;
determine a second difference value between the first cooling value and the second cooling value;
determine a third difference value between the first baseload value and the second baseload value;
select a largest difference value among the first difference value, the second difference value, and the third difference value as a basis for diagnosis of energy usage;

generate an electronic message including
(i) a notification of the projected consumption cost; and
(ii) an instruction to automatically adjust settings to modify resource consumption associated with the largest difference value; and
transmit through the data communication network the electronic message to a client device associated with the user to cause the instruction to be performed and the resource consumption to be modified.

23. A computer-implemented method for providing a bill notification, the method comprising:
obtaining consumption data associated with a user;
analyzing, by the computer processor, after a first time period has elapsed, the consumption data to determine a consumption cost for the user, the consumption cost indicating a monetary cost that the user will be required to pay for resource consumption during the first time period, the first time period being a period of time in which the user's energy consumption is tracked to determine a bill;
receiving, by the computer processor, historical consumption cost data for a prior time period before the first time period;
determining, by the computer processor, that the consumption cost exceeds a threshold consumption cost indicating that the consumption cost is greater than a prior monetary cost billed to the user for resource consumption during the prior time period;
determining, by the computer processor, (i) a first heating value, a first cooling value, and a first baseload value for the first time period and (ii) a second heating value, a second cooling value, and a second baseload value for the prior time period;
determining, by the computer processor, a first difference value between the first heating value and the second heating value;
determining, by the computer processor, a second difference value between the first cooling value and the second cooling value;
determining, by the computer processor, a third difference value between the first baseload value and the second baseload value;
selecting, by the computer processor, a largest difference value among the first difference value, the second difference value, and the third difference value as a basis for diagnosis of energy usage;
generating, by the computer processor, an electronic message including
(i) a notification that the threshold consumption cost is exceeded for the first time period, and
(ii) an instruction to automatically adjust settings to modify resource consumption associated with the largest difference value; and
transmitting, by the computer processor through a data communication network, the electronic message to a client device associated with the user to cause the instruction to be performed and resource consumption to be modified.

24. The computer-implemented method of claim 23, further comprising:
receiving, by the computer processor, first weather data corresponding to the first time period;
receiving, by the computer processor, second weather data corresponding to the prior time period;
determining, by the computer processor, that exceeding the projected consumption cost is caused based at least in part on a comparison between the first weather data and the second weather data; and
providing, by the computer processor, in the electronic message an indication that the consumption cost will be high for the first time period based at least in part the comparison between the first weather data and the second weather data.

25. The computer-implemented method of claim 24, wherein the first weather data indicates a first temperature value associated with the first time period, the second weather data indicates a second temperature value associated with the prior time period, and the first temperature value is higher or lower than the second temperature value.

26. The computer-implemented method of claim 23, wherein the threshold consumption cost is further based on historical weather data including at least one past temperature during a prior time period, the historical weather data indicating a difference in weather data representing at least one temperature during the first time period in comparison to the historical weather data including the at least one past temperature.

27. The computer-implemented method of claim 23, wherein providing one or more use reports to the user further comprises:
determining, by the computer processor, whether a rate change caused the consumption cost to exceed the threshold consumption cost; and
providing, in the electronic message, an indication that the rate change caused the consumption cost to exceed the threshold consumption cost.

28. The computer-implemented method of claim 23, wherein providing one or more use reports to the user further comprises:
generating, using at least the historical consumption cost data, a graphical representation of the historical consumption cost data; and
providing, in the electronic message, the graphical representation of the historical consumption cost data.

29. The computer-implemented method of claim 28, further comprising:
providing, in the electronic message, an indication that an increase in consumption corresponding to a heating caused the consumption cost to exceed the threshold consumption cost.

30. The computer-implemented method of claim 28, further comprising:
providing, in the electronic message, an indication that an increase in consumption corresponding to cooling caused the consumption cost to exceed the threshold consumption cost.

31. A computing device for bill notifications, the computing device comprising:
at least one processor; and
memory storing instructions that, when executed by the at least one processor, cause the computing device to:
obtain consumption data associated with a user;
analyze, after a first time period has elapsed, the consumption data to determine a consumption cost for the user, the consumption cost indicating a monetary cost that the user will be required to pay for resource consumption during the first time period, the first time period being a period of time in which the user's energy consumption is tracked to determine a bill;
receive historical consumption cost data for at least one prior time period before the first time period;

determine that the consumption cost exceeds a threshold consumption cost indicating that the consumption cost is greater than a prior monetary cost billed to the user for resource consumption during the prior time period;

determine (i) a first heating value, a first cooling value, and a first baseload value for the first time period and (ii) a second heating value, a second cooling value, and a second baseload value for the at least one prior time period;

determine a first difference value between the first heating value and the second heating value;

determine a second difference value between the first cooling value and the second cooling value;

determine a third difference value between the first baseload value and the second baseload value;

select a largest difference value among the first difference value, the second difference value, and the third difference value as a basis for diagnosis of energy usage;

generate an electronic message including
(i) a notification that the threshold consumption cost is exceeded for the first time period, and
(ii) an instruction to automatically adjust settings to modify resource consumption associated with the largest difference value; and transmit, through a data communication network, the electronic message to a client device associated with the user to cause the instruction to be performed and resource consumption to be modified.

32. A non-transitory computer readable storage medium storing instructions for usage alerts on a computing device, the instructions when executed by a processor causing the processor to:

obtain consumption data associated with a user;

analyze, after a first time period has elapsed, the consumption data to determine a consumption cost for the user, the consumption cost indicating a monetary cost that the user will be required to pay for resource consumption during the first time period, the first time period being a period of time in which the user's energy consumption is tracked to determine a bill;

receive historical consumption cost data for at least one prior time period;

determine that the consumption cost exceeds a threshold consumption cost, the threshold consumption cost being determined based at least in part on the historical consumption cost data;

determine (i) a first heating value, a first cooling value, and a first baseload value for the first time period and (ii) a second heating value, a second cooling value, and a second baseload value for the at least one prior time period;

determine a first difference value between the first heating value and the second heating value;

determine a second difference value between the first cooling value and the second cooling value;

determine a third difference value between the first baseload value and the second baseload value;

select a largest difference value among the first difference value, the second difference value, and the third difference value as a basis for diagnosis of energy usage;

generate an electronic message including
(i) a notification that the threshold consumption cost is high exceeded for the first time period, and
(ii) an instruction to automatically adjust settings to modify resource consumption associated with the largest difference value; and transmit, through a data communication network, the electronic message to a client device associated with the user to cause the instruction to be performed and the resource consumption to be modified.

* * * * *